United States Patent Office 3,255,163
Patented June 7, 1966

3,255,163
HALO BUTENYL ACRYLATES AND POLYMERS THEREOF
Riad H. Gobran, Levittown, and Philip Bernstein, Yardley, Pa., assignors to Thiokol Chemical Corporation, Bristol, Pa., a corporation of Delaware
No Drawing. Filed Aug. 22, 1963, Ser. No. 303,950
10 Claims. (Cl. 260—86.1)

The present invention relates to a novel class of polymerizable compounds which have the structure

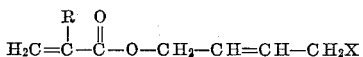

in which R may be H or a lower alkyl radical such as methyl and X may be Cl, Br or I, homopolymers of such monomers and processes for making such monomers.

Curable acrylate elastomers are used to a great extent in the preparation of many molded objects. Many of the molding processes of the present day art in which such curable acrylate elastomers are used, however, require that the polymer be curable in the mold in a relatively very short time in order to allow for fast, repetitive use of the molding equipment. Standard acrylate elastomers, as a rule, are either not curable at all or, if curable, do not usually cure fast enough to satisfy the fast cure requirements of the present day production line type molding equipment. To prepare acrylate elastomers which can be cured in relatively short times, it is usually necessary, therefore, to incorporate therein, as part of the polymer structure, cure sites which will allow for the desired fast cure cycles. One way of incorporating such cure sites in the polymer is to copolymerize, with the standard acrylate monomers being used, a relatively small amount of a polymerizable monomer which will provide for the type and quantity of fast cure sites desired, but which, at the same time will not detract to any great extent, if at all, from the desired physical properties of the cured elastomer.

An object of the present invention, therefore, is to provide for a novel class of polymerizable monomers.

Another object of the present invention is to provide for a novel class of curable acrylate homopolymers.

Another object of the present invention is to provide a class of polymerizable monomers which can be copolymerized with, and provide fast cure sites in, curable acrylate elastomers without detracting to any great extent, if at all, from the physical properties of the cured elastomer.

Another object of the present invention is to provide a process by which such novel class of polymerizable monomers may be readily obtained.

It has been unexpectedly found, according to the present invention, that curable acrylate elastomers having relatively very fast cure cycles can be readily prepared if the elastomer contains active Cl, Br or I cure sites which have been incorporated in the polymer by polymerizing therein one or more of the class of compounds having the structure

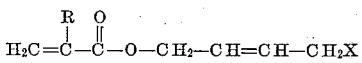

in which X may be Cl, Br or I and R may be H or a lower alkyl radical such as methyl. Where X is Cl and R is H the compound is 4-chloro-2-butenyl acrylate. This compound is a water white liquid which has the following properties: B.P. 69–70° C. (2.5 mm. Hg); $n_D^{24}$ 1.4757 and $d_{24° C.}$ 1.1137.

Fast curing acrylate elastomers can be prepared with the novel monomers of the present invention either by homopolymerizing them or by interpolymerizing two or more of them or by interpolymerizing one or more of them with one or more acrylate monomers such as methyl acrylate, methyl methacrylate, ethyl acrylate, ethyl methacrylate, propyl acrylate, butyl acrylate, ethyl hexyl acrylate and the like. By a "fast cure cycle" it is meant, according to the present invention, that the elastomer can be cured to such an extent in a heated mold in about five minutes, that the molded object can then be readily demolded and further processed thereafter according to standard post molding procedures. To obtain the desired fast cure cycles about 0.1 to 10 mol percent of one or more of the novel monomers of the present invention should be incorporated in the desired elastomeric product. The polymerization reactions can be conducted using standard acrylate polymerization techniques, initiators, catalysts and the like. Curing of acrylate elastomers made with the novel monomers of the present invention can be conducted with the aid of such curing agents as sulfur, peroxides and ammonium benzoate.

The novel monomers of the present invention can be readily prepared by the transesterification of a lower alkyl acrylate or alkacrylate, such as methyl acrylate or methyl methacrylate, by a 4-halo-2-butene-1-ol using a catalyst such as p-toluene sulfonic acid. The term halo in this regard signifies either a chloro, bromo or iodo group. The transesterification reaction proceeds as follows:

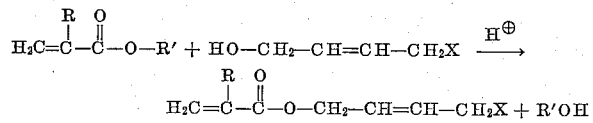

R and X are as defined above and R' as a lower alkyl radical. In the prepartion of 4-chloro-2-butenyl acrylate, for example, methyl acrylate may be transesterified with 4-chloro-2-butene-1-ol. In order to have the transesterification reaction proceed readily in the desired direction, rather than tend to maintain a state of equilibrium, it is preferable to drive the reaction to completion by using a large excess of the lower alkyl acrylate reactant. The resulting ROH/lower alkyl acrylate azeotropic mixture can be readily removed by distillation from the reaction system during the reaction to further facilitate driving the reaction to completion. To obtain the best yields it is preferable, in this regard, that the mol ratio of lower alkyl acrylate to 4-halo-2-butene-1-ol to be about 2.5:1 to 5.0:1. The catalyst employed in the transesterification reaction should be used in amounts of about 0.001 to 0.2 and preferably about 0.1 mol percent based on the total mols of reactants being employed. Because of the highly reactive nature of the novel monomers of the present invention it is preferable to add a polymerization inhibitor to the transesterification reaction system to prevent premature polymerization of the desired monomer. Such inhibitors are used to the extent of about 0.05 to 1.0 mol percent, based on the mols of monomers being produced, and they include compounds such as hydroquinone, the monomethyl ether of hydroquinone, methylene blue and other inhibitors of this type.

The transesterification reaction can be conveniently conducted in about 2 to 10 hours at the temperature required to effect the azeotropic distillation operation.

The following examples are merely illustrative of the present invention and are not intended as a limitation upon the scope thereof.

*Example 1*

A clean, dry 500 ml. glass reaction flask was charged with 240 grams of methyl acrylate, 49 grams of 4-chloro-2-butene-1-ol, 15 grams of hydroquinone and 1 gram of p-toluenesulfonic acid. The temperature of the reaction mixture was raised as a methylacrylate-methanol azeotrope. At the end of this reaction time the mixture was fractionally distilled. The second fraction collected at 100° C./35 mm. had a refractive index of 1.4760 at 24° C. and was shown by infrared spectroscopy to be relatively pure. This fraction polymerized to a rubbery homopolymer using azo-bis-isobutyronitrile as a catalyst at 100° C.

*Example 2*

The following reactants were charged into a 500 ml. glass reaction flask: 240 grams of methyl acrylate, 49 grams of 4-chloro-2-butene-1-ol, 15 grams of hydroquinone and 2 grams of p-toluenesulfonic acid. During the reaction, which was conducted for 10 hours at 64° C., the methanol formed was removed by azeotropic distillation as a methanol-methylacrylate azeotrope. This distillate measured 150 ml. At the end of the reaction, the excess methylacrylate was removed by distilling in vacuo and the residue, which contained the 4-chloro-2-butenyl acrylate, was fractionally distilled using a spinning band column. The following fractions were collected:

| Fraction | Temp., °C. | Pressure, mm. | Ref. Index $n_D^{24}$ | Weight in Grams |
|---|---|---|---|---|
| 1 | 50–51 | 0.75 | 1.4745 | 6.7 |
| 2 | 62–63 | 1.50 | 1.4755 | 10.0 |
| 3 | 69–70 | 2.50 | 1.4757 | 22.0 |

Infrared spectroscopy showed fraction one to be slightly contaminated with the initial reactants. Fractions two and three were shown to be relatively pure. The yield of the fractional distillation was 52.7% of theory. Chemical analysis, molar refractivity and infrared determinations agreed with theoretical calculations and spectra.

Portions of all of the above fractions formed rubbery homopolymers when heated to 100° C. using azo-bis-isobutyronitrile as a catalyst. These homopolymers gave a positive silver nitrate test, which demonstrated the active nature of the chlorine constituent.

*Example 3*

To illustrate the ability of the 4-chloro-2-butenyl acrylate to interpolymerize with another monomer to form a curable copolymer, a portion of fraction 3 prepared in Example 2 was reacted with ethyl acrylate under the following described conditions: a three liter Morton flask, equipped with two Graham condensers in series, a mechanical stirrer, a thermocouple heat registering device and a Glas-Col heating mantle was charged with 14.4 grams of Alcogum PA-15 (sodium polyacrylate latex thickener) and 750 ml. of hot water. The materials were agitated mechanically until solution of the Alcogum was effected. The reactor was then charged with 237.5 grams of ethyl acrylate and 12.5 grams of 4-chloro-2-butenyl acrylate and finally wrapped with asbestos. When the reactants reached reflux temperature (90° C.), 0.8 ml. of catalyst solution (previously prepared by dissolving 0.275 gram of azobis-isobutyronitrile in reagent grade benzene and brought to a total volume of 25 ml. with benzene) was added. The mixture was reacted for an additional 132 minutes under the above described conditions with the addition of 0.64 ml. of catalyst solution at 22 minute intervals for a total of 6 additions. The monomeric weight ratio was 95 parts of ethyl acrylate to 5 parts of 4-chloro-2-butenyl acrylate.

After the reaction interval the copolymer was isolated by the addition of sodium chloride and a jet of water. That portion of polymer separating to the surface was then removed and the remainder collected by filtration under vacuum. The polymer was then washed with water, air dried overnight and finally dried for 35 hours in a vacuum oven at 0.40 mm. pressure and 65° C. The polymer yield was 194.2 grams or 77.7% of theory.

The interpolymer was then cured for 5 minutes at 340° F. using the following formulation:

| | Grams |
|---|---|
| Polymer | 100 |
| Stearic acid | 2 |
| Ammonium benzoate | 2 |
| Philblack A (furnace black) | 40 |

The physical properties of the cured polymer were:

| | Original | After being Tempered for 5 hrs. at 350° C. |
|---|---|---|
| Tensile (p.s.i.) | 935 | 1035 |
| Elongation (Percent) | 225 | 165 |
| Hardness (Shore A) | 50 | 62 |
| 100% Modulus (p.s.i.) | 345 | 560 |
| 200% Modulus (p.s.i.) | 855 | |
| Compression Set (22 hrs./302° F.) | | 22 |

*Example 4*

In this example, an interpolymer of ethyl acrylate and 4-chloro-2-butenyl acrylate was prepared using fraction two and three of the chlorobutenyl acrylate monomer prepared in Example 2. The monomer ratio by weight was 97 parts ethyl acrylate to 3 parts of 4-chloro-2-butenyl acrylate.

A three liter Morton flask set up as described in Example 3 was charged with 14.4 grams of Alcogum PA-15 (sodium polyacrylate latex thickener) and 750 ml. of hot water. The mixture was agitated until the Alcogum dissolved. The total monomer charge, consisting of 242.5 grams of ethyl acrylate, 6.1 grams of fraction 3 and 1.4 grams of fraction 2 of the 4-chloro-2-butenyl acrylate prepared in Example 2, was then added and the reactor wrapped with asbestos. Heat was applied to the system and when the mixture reached reflux temperature (87° C.), 0.8 ml. of azo-bis-isobutyronitrile catalyst, prepared as outlined in Example 3, was added. After twenty-two minutes, and after each succeeding twenty-two minute interval thereafter, 0.64 ml. additional catalyst was added until a total of six additions were made. The total reaction time from the initial addition of catalyst was 132 minutes.

The interpolymer produced was precipitated to the surface by the addition of sodium chloride and a jet of water, isolated by filtration and washed with about 12 liters of hot water using a Buchner funnel and suction. The polymer was dried overnight at 64° C. using an aspirator to reduce the pressure and then in a vacuum oven at 66° C. for 30½ hours at a pressure of 0.30 to 0.35 mm. pressure. The yield was 200 grams or 80.2%.

The interpolymer was cured using the cure formulation and conditions outlined in Example 3. The physical properties of the cured interpolymer were:

| | Original | Tempered for 5 hrs. @ 350° C. | Tempered Sheet Heat Aged 70 Hours @ 300° F. |
|---|---|---|---|
| Tensile (p.s.i.) | 1,000 | 1,220 | 925 |
| Elongation (percent) | 320 | 230 | 215 |
| Hardness (Shore A) | 54 | 58 | 63 |
| 100% Modulus (p.s.i.) | 260 | 480 | 440 |
| 200% Modulus (p.s.i.) | 675 | 1,035 | 870 |
| 300% Modulus (p.s.i.) | 955 | | |
| G10,000 in hexane (° F.) | 00 | +4 | |
| Oil Immersion Test for 70 hours @ 302° F.: | | | |
| In ASTM #3 oil— | | | |
| Hardness (Shore A) | | 55 | |
| Swell (percent) | | 18 | |
| In ASTM #4 oil— | | | |
| Hardness (Shore A) | | 68 | |
| Swell (percent) | | 1.5 | |
| Compression Set 22 hrs./302° F | | 44 | |

We claim:
1. A compound having the structure

$$H_2C=\underset{R}{C}-\underset{\|}{\overset{O}{C}}-O-CH_2-CH=CH-CH_2X$$

in which
R is selected from the group consisting of H and lower alkyl groups, and
X is selected from the group consisting of Cl, Br and I.
2. A compound as in claim 1 in which R is H.
3. A compound as in claim 1 in which X is Cl.
4.

$$H_2C=CH-\overset{O}{\underset{\|}{C}}-O-CH_2-CH=CH-CH_2Cl$$

5. A homopolymer of a compound having the structure $$H_2C=\underset{R}{C}-\underset{\|}{\overset{O}{C}}-O-CH_2-CH=CH-CH_2X$$

in which R is selected from the group consisting of H and lower alkyl groups and X is selected from the group consisting of Cl, Br and I.
6. A homopolymer as in claim 5 in which R is H.
7. A homopolymer as in claim 5 in which X is Cl.
8. A homopolymer of 4-chloro-2-butenyl acrylate.
9. Interpolymers of at least two monomers having the structure $$H_2C=\underset{R}{C}-\underset{\|}{\overset{O}{C}}-O-CH_2-CH=CH-CH_2X$$

in which R is selected from the group consisting of H and lower alkyl groups and X is selected from the group consisting of Cl, Br and I.

10. Interpolymers of at least one monomer having the structure $$H_2C=\underset{R}{C}-\underset{\|}{\overset{O}{C}}-O-CH_2-CH=CH-CH_2X$$

in which R is selected from the group consisting of H and lower alkyl groups and X is selected from the group consisting of Cl, Br and I and at least one acrylate monomer selected from the group consisting of methyl acrylate, methyl methacrylate, ethyl acrylate, ethyl methacrylate, propyl acrylate, butyl acrylate and ethylhexyl acrylate.

References Cited by the Examiner

UNITED STATES PATENTS

| | | | |
|---|---|---|---|
| 2,109,877 | 3/1938 | Barrett | 260—89.5 |
| 2,366,667 | 1/1945 | Deebel | 260—486 |
| 2,388,440 | 11/1945 | Rehberg et al. | 260—89.5 |
| 2,822,348 | 2/1958 | Haslam | 260—86.1 |

FOREIGN PATENTS 891,638  3/1962  Great Britain.

JOSEPH L. SCHOFER, *Primary Examiner.*

DONALD E. CZAJA, *Examiner.*

H. WONG, *Assistant Examiner.*